United States Patent
Patarchi

(10) Patent No.: US 7,375,451 B2
(45) Date of Patent: May 20, 2008

(54) ELECTRIC MOTOR HAVING A PERMANENT MAGNET ROTOR AND A STATOR CORE OF UNITED POLES

(75) Inventor: Alberto Patarchi, Ostia Lido (IT)

(73) Assignee: Faber S.p.A., Ancona (IT)

( * ) Notice: Subject to any disclaimer, the term of this patent is extended or adjusted under 35 U.S.C. 154(b) by 0 days.

(21) Appl. No.: 10/824,389

(22) Filed: Apr. 14, 2004

(65) Prior Publication Data
US 2005/0231061 A1  Oct. 20, 2005

(51) Int. Cl.
*H02K 1/18* (2006.01)
(52) U.S. Cl. ................................ 310/218; 310/216
(58) Field of Classification Search ............. 310/218, 310/46, 156.01, 156.08
See application file for complete search history.

(56) References Cited

U.S. PATENT DOCUMENTS

| | | | | |
|---|---|---|---|---|
| 2,831,154 A | * | 4/1958 | Dudenhausen | ............. 318/807 |
| 5,038,064 A | * | 8/1991 | Fiorenza | ..................... 310/116 |
| 5,327,032 A | | 7/1994 | Esswein | |
| 6,204,584 B1 | * | 3/2001 | Muszynski | ............. 310/156.08 |
| 6,750,584 B2 | * | 6/2004 | Smith | ......................... 310/218 |
| 2002/0158535 A1 | * | 10/2002 | Maul | ..................... 310/156.08 |
| 2004/0207279 A1 | * | 10/2004 | Godfrey | ............... 310/156.01 |

FOREIGN PATENT DOCUMENTS

| | | |
|---|---|---|
| EP | 0 342 733 | 11/1989 |
| EP | 0 676 853 | 10/1995 |
| EP | 0 892 490 | 1/1999 |

\* cited by examiner

*Primary Examiner*—Dang Le
*Assistant Examiner*—Hanh N. Nguyen
(74) *Attorney, Agent, or Firm*—James V. Costigan; Hedman & Costigan, P.C.

(57) ABSTRACT

Electric motor (1) comprising a stator (2), a magnetic induction core (3) constrained to said stator, at least one magnetic excitation coil (4a, 4b) associated to said induction core, a rotor (5) of substantially cylindrical shape comprising at least one permanent magnet adapted to form on said rotor at least two magnetic poles of opposite polarity, said core and said coils being adapted to form at least two magnetic induction poles of opposite polarity on said stator core of contiguous poles united in a single body.

13 Claims, 4 Drawing Sheets

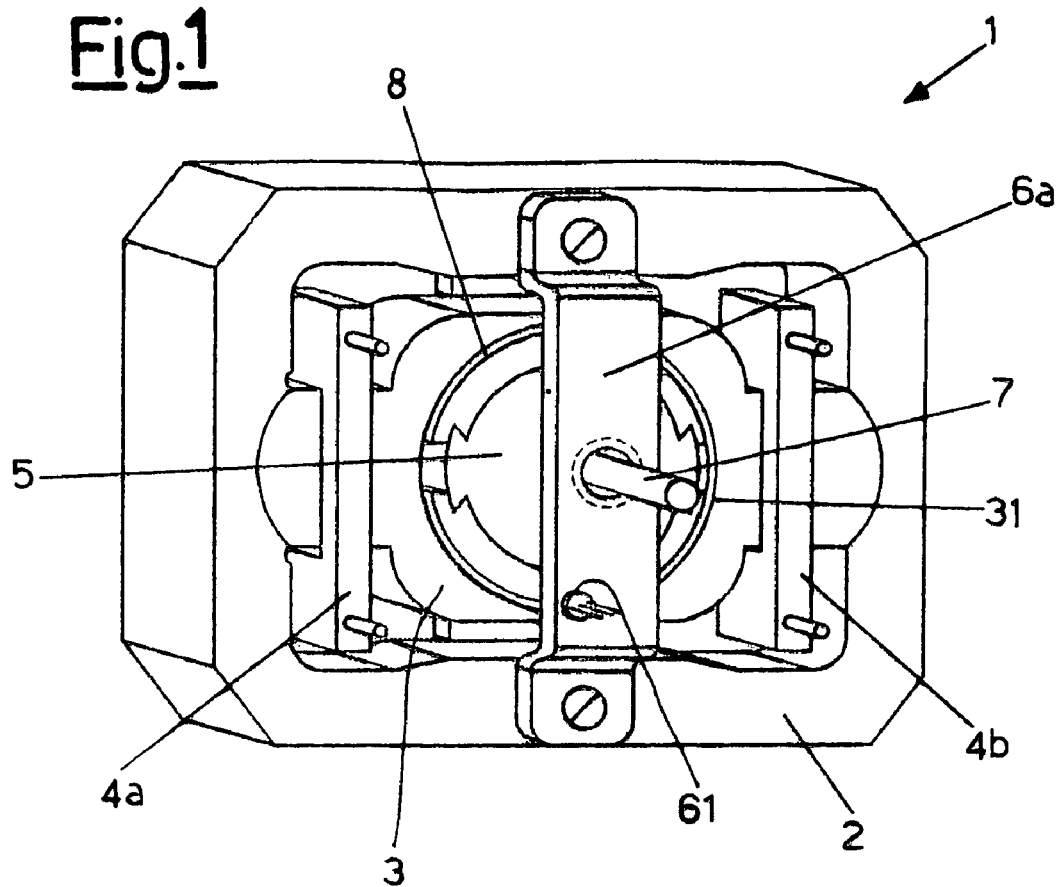
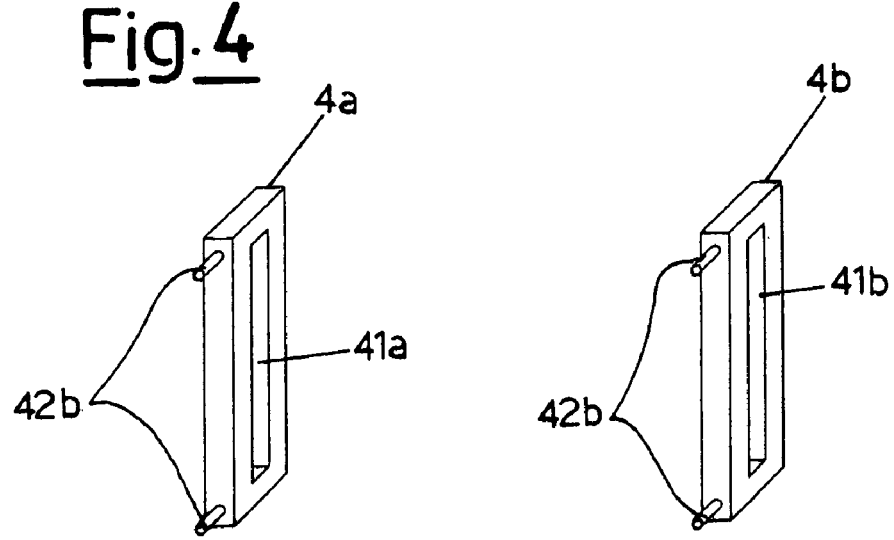

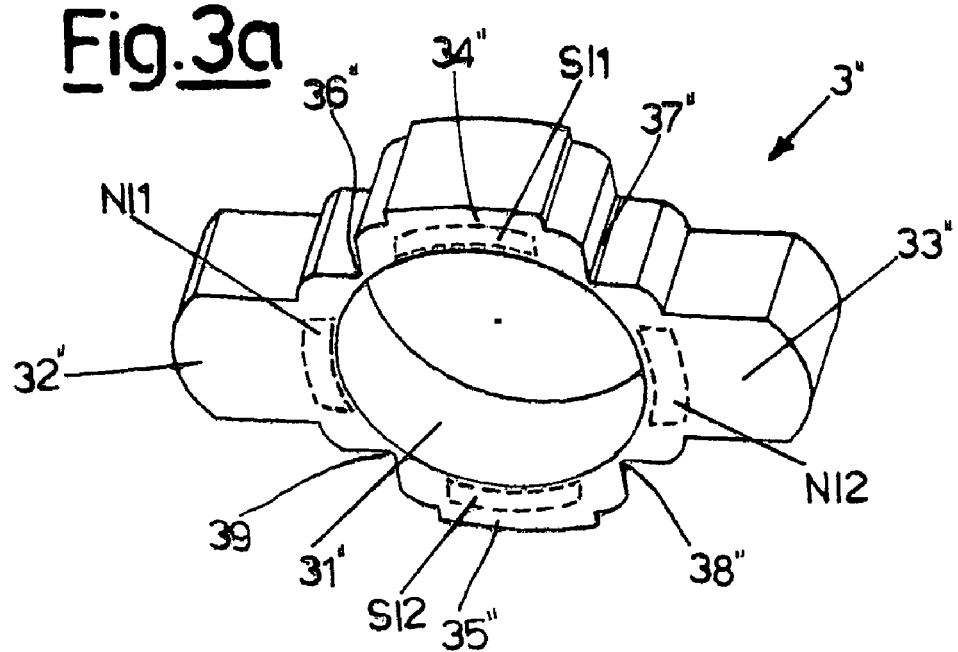
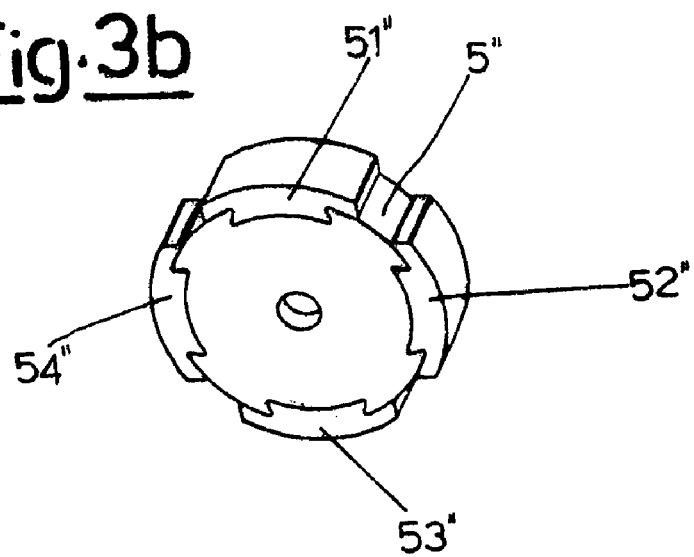

ELECTRIC MOTOR HAVING A PERMANENT MAGNET ROTOR AND A STATOR CORE OF UNITED POLES

The present invention refers to an electric motor having a permanent magnet rotor.

In particular, the invention concerns an electric motor having a rotor achieved through permanent magnets and a stator achieved with contiguous poles, in which the direction of rotation of such a rotor is fixed.

It should be noted that the electric motor of the present invention may also be used as an electric dynamo; in use as an electric motor, electric energy is supplied to the motor's electromagnetic induction coils, causing the rotor to rotate according to a fixed rotation direction; in use as an electric dynamo mechanical energy is applied to the rotor, and electrical energy is gained by the ends of said electromagnetic induction coils.

Four-pole monophase electrical motors with permanent magnet rotors comprising a coil associated with each stator pole are known at the state of the art. To determine the direction of rotation of such motors each stator pole has a circular cut with greatly increasing air gap, such that an irregular magnetic flux is created on each pole, with one area for example having lower magnetic flux. The rotor, once such coils are energised, tends to rotate in the direction of lower magnetic flux, determining a fixed direction of motor rotation.

A further known solution for determining an irregular magnetic flux on the stator poles is to achieve a graded air gap on each of said poles, in order to have them rotate in the direction of such a grade.

The Applicant has observed that such flux irregularity does not determine with certainty the rotation direction of the motor. In fact, depending on the charge present on the motor rotation axis, oscillations may be created on the rotor which position the rotor itself such that the motor moves in the opposite direction to that desired. Furthermore, the increasing air gap created to give rise to such irregularities causes a lowering of the magnetic excitation flux, diminishing the motor efficiency and, at the same time, augmenting the noise of the motor itself as a consequence of the flux discontinuity during the rotation.

The Applicant has achieved an electric motor with permanent magnet rotor, in which the rotor's rotation direction is determined by a magnetic separation recess achieved on the poles of the stator's induction core; such a core is produced in a single piece and the magnetic separation recesses are achieved on the core's outer surface, in order to avoid discontinuities in the interaction zone between core and rotor.

Such recess, when the motor is de-energised, determines the positioning of each rotor pole between the stator's two induction poles, of which one repels the rotor pole and the other attracts it, determining in such a manner a single direction of rotor rotation, once the motor is energised.

One aspect of the present invention regards an electric motor comprising a stator, a magnetic induction core constrained to said stator, at least one magnetic excitation coil associated to said induction core, adapted to form at least two magnetic induction poles of opposite polarity on said core and a rotor of substantially cylindrical shape comprising at least one permanent magnet adapted to create on said rotor at least two magnetic poles of opposite polarity, characterised in that said magnetic induction core is produced in a single body and comprises a central hole for housing said rotor, at least two opposing extensions adapted to form said at least two magnetic induction poles placed opposite each other and in proximity to said central hole, at least two opposing notches of magnetic separation, alternately arranged with respect to said extensions, adapted to generate a magnetic separation between two adjacent, opposite-sign poles of the induction core, such that the rotor is arranged in the de-energised motor with each magnetic pole between two adjacent poles of the induction core.

The characteristics and advantages of the motor according to the present invention will be clearer and more evident from the following illustrative and nonlimiting description of an embodiment with reference to the attached figures in which:

FIG. 1 is a perspective view of the electric motor in its entirety, according to the present invention;

FIG. 2b is a perspective view of the rotor associated with the induction core of FIG. 2a;

FIG. 3a is a perspective view of a further embodiment of the induction core of the motor of FIG. 1, according to the present invention;

FIG. 3b is a perspective view of the rotor associated with the induction core of FIG. 5a.

FIG. 4 is a perspective view of the induction coils of the motor of FIG. 1;

Figure 5A:
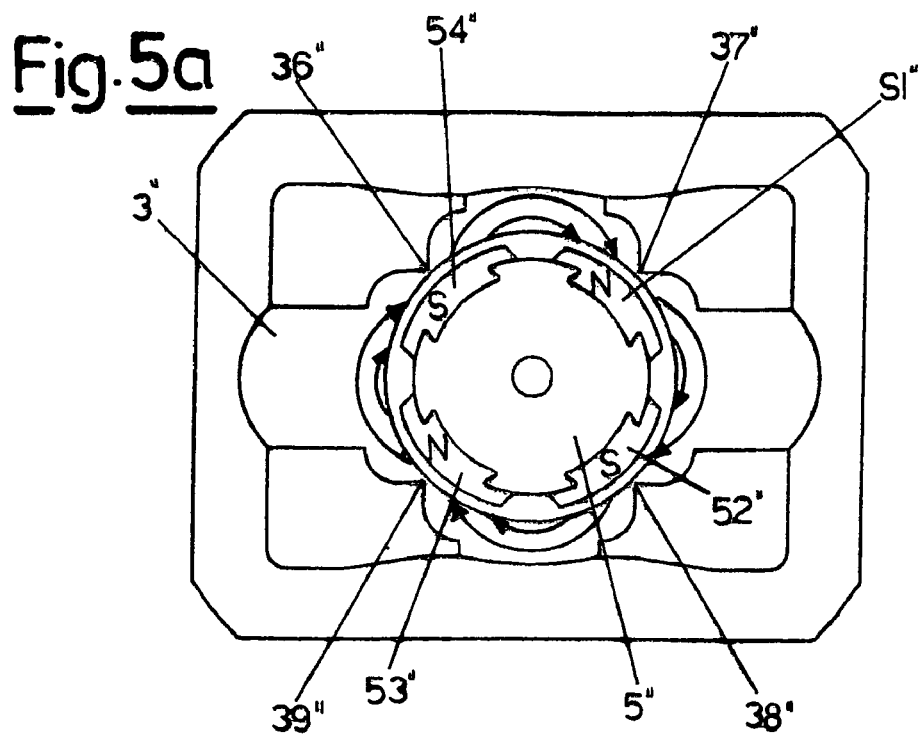
Figure 5B:
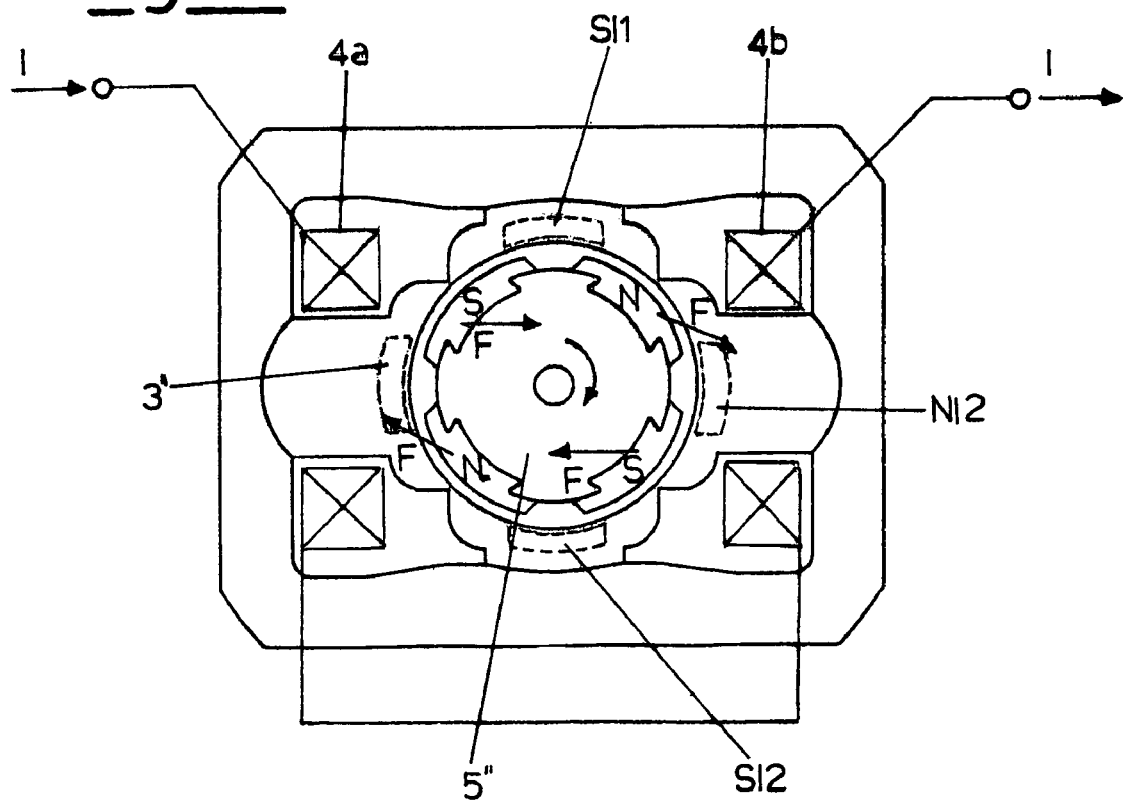

FIGS. 5a and 5b schematically illustrate the positioning of the rotor poles with respect to the poles of the induction core respectively when the motor is de-energised and upon starting the motor.

In FIG. 1 an example of a monophase electric motor is illustrated in accordance with the present invention, comprising a stator 2 of substantially rectangular shape and made of a ferromagnetic material, an induction core 3 with a central hole 31 in which a rotor 5 of substantially cylindrical shape is inserted, comprising at least one permanent magnet. To such induction core at least one coil of induction 4a and 4b is associated. The interposed space between said rotor inserted in the central hole and said induction core is an air ring 8 known as the central air gap of the motor.

According to the present invention, said induction core is achieved in a single body and is composed of a ferromagnetic material.

The rotor 5 is maintained in such position by a couple of locking posts 6a and 6b fastened on opposite sides of the stator 2. A rotation shaft 7 transmits the rotation motion of said rotor 5 outside the motor.

Such induction core, through the magnetic field created by said induction coils, generates at least two magnetic poles of opposite polarity (N and S), adapted to interact with corresponding magnetic poles of opposite polarity (N and S) generated by said at least one permanent magnet.

Preferably, on one of the locking posts 6a or 6b a housing 61 has been made for a polarity sensor, for example a Hall-Effect sensor adapted to control the polarity of the induction core. The sensor cooperates with a circuit for driving the power supply to the motor.

In place of the polarity and electronics sensor a common brush manifold may be used.

In the case in which the electric motor of the present invention is a "bipolar" motor, the core 3 is shaped in order to form two poles of magnetic induction arranged opposite each other in proximity to the circumference of the central hole 31; on the side surface of the rotor 5 two permanent magnets or a permanent multipolar magnet are arranged, adapted to generate two corresponding magnetic poles.

In the case in which the electric motor of the present invention is a "tetrapolar" motor, the core is shaped in such a manner as to generate four equidistant poles of magnetic induction arranged in proximity to the circumference of the central hole 31; on the side surface of the rotor four permanent magnets are arranged, adapted to generate four corresponding, equidistant magnetic poles.

Figure 2A:
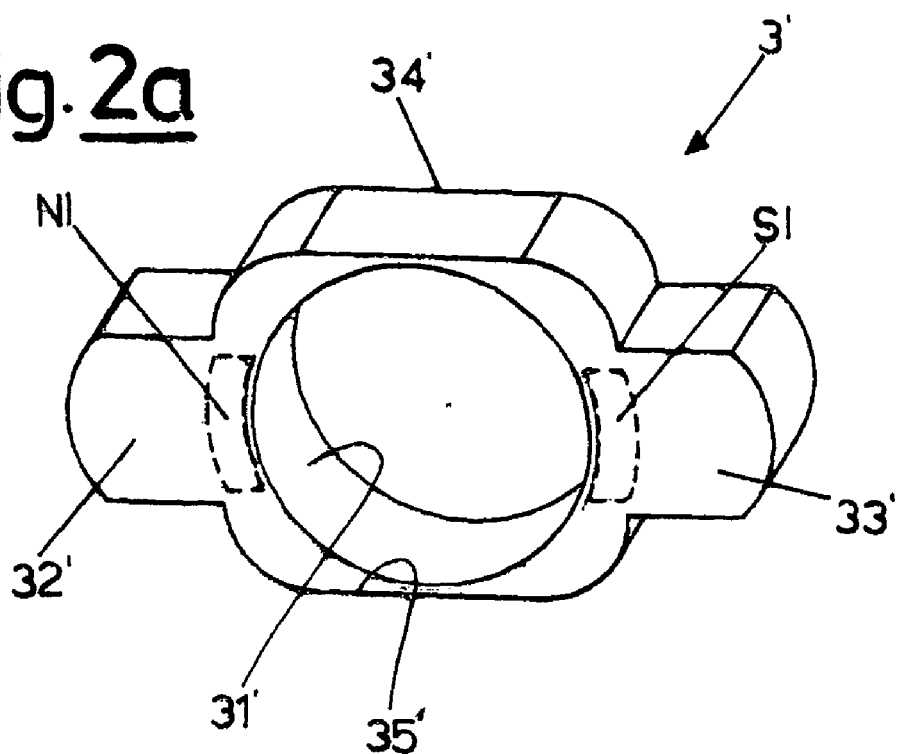
FIG. 2a is a perspective view of an embodiment of the induction core of the motor of FIG. 1, according to the present invention.
Figure 2B:
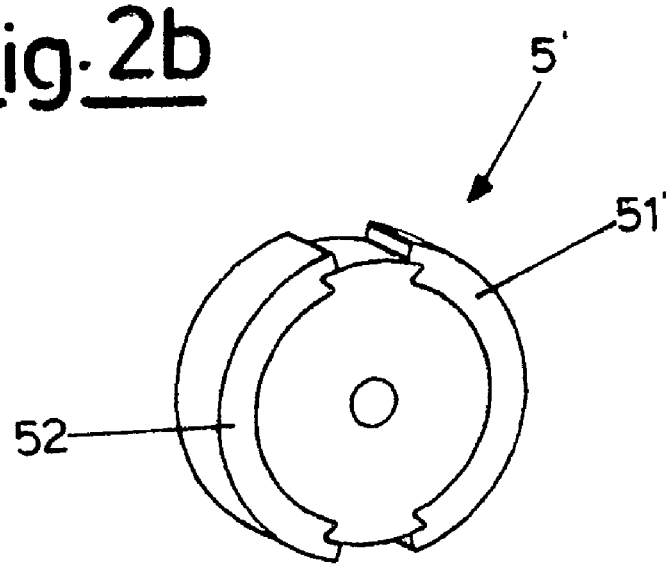

In FIGS. 2a and 2b an embodiment of the present invention is illustrated in which the motor is bipolar and the induction core 3' and the rotor 5' each form two poles.

In particular, in FIG. 2a the induction core 3' comprises a central hole 31' and two opposing extensions 32' and 33' which may be matched with said induction coils 4a and 4b as shown in FIG. 1. Such extensions form two opposing poles of induction NI and SI.

Such induction core comprises, furthermore, two magnetic separation notches 34' and 35', opposite each other, which determine a fixed angular position of the rotor with respect to the stator core when the motor is de-energised.

In FIG. 2b the rotor is shown comprising two permanent, opposing magnets 51' and 52', inserted in the rotor for example through dovetail guides. Such magnets are adapted to form two magnetic poles.

In FIGS. 3a and 3b an embodiment of the present invention is illustrated in which the motor is tetrapolar and the induction core 3" and the rotor 5" each form four poles.

In particular in FIG. 3a the induction core 3" comprises a central hole 31" and four extensions 32", 33", 34" and 35" arranged at substantially 90° to each other which may be matched with said induction coils. Such extensions generate four equidistant poles of magnetic induction NI1, NI2, SI1 and SI2 arranged in proximity to the central hole 31".

Such induction core comprises, furthermore, four magnetic separation notches 36", 37", 38" and 39", each arranged between two extensions set at 90° to each other, which determine a fixed angular position of the rotor with respect to the stator core when the motor is de-energised. In FIG. 3b the rotor 5" is shown comprising four equidistant permanent magnets 51", 52", 53" and 54", inserted in the rotor for example through dovetail guides. Such magnets are adapted to form four equidistant magnetic poles.

In both embodiments the presence of the notches determines, when the motor is de-energised, a fixed angular position, each magnetic rotor pole placed between two adjacent poles of the induction core.

In such a position, the direction of energised motor rotation is fixed in that one of the two adjacent poles of induction attracts the rotor pole and the other repels it.

In accordance with the present invention, the magnetic separation notches are achieved in the outer part of the induction core, which has perfect symmetry and maintains its circular central hole. The air gap of the motor presents itself as a uniform ring 8 and therefore does not influence motor efficiency, such as occurs in motors with more irregular central air gaps.

In FIG. 4 two electromagnetic induction coils 4a and 4b are illustrated. Such coils are provided with a central opening 41a or 41b for the insertion of the above-cited induction core extensions, and with electrical contacts 42a and 42b for the electric connection to appropriate driving circuits.

In FIG. 5a the positioning of the poles of the rotor 5 with respect to the induction core in the case of a tetrapolar motor is schematically illustrated when the motor is de-energised. In particular, the four poles 51", 52", 53" and 54" of the rotor are arranged in correspondence with the magnetic separation notches. In the subsequent FIG. 5b the coils 4a and 4b are shown connected in series and are crossed by the same intensity of current I. Such current generates a magnetic flux which forms the poles of induction NI1, NI2, SI1 and SI2 already illustrated in FIG. 3a. The rotor pole 51" is repelled by the induction pole SI1 since it has the same electric polarity (S and S) and is attracted by the adjacent pole of induction NI2—analogous to what occurs at the other rotor poles; this generates the rotor movement according to the rotation direction, indicated in the figure by the arrow F. Such rotation direction is the motor's fixed rotation direction.

In an alternative form of the present invention, the motor may be enlarged with the use of additional induction coils, leaving the induction core's linear parameters intact.

A motor achieved according to the present invention may reach efficiency levels of greater than 70%. Furthermore, for the same obtainable power, the motor according to the present invention has reduced dimensions, for example for the same generated power the overall size is less than 70% that of a conventional asynchronous motor. In such a manner, the costs of the motor are considerably limited given the lower quantity of required material. Furthermore, during the production phase of the induction core, in particular during the internal cutting of the central hole, it is possible to produce the rotor from the removed material, avoiding therefore the waste of additional material.

The technology for the achievement of the motor according to the present invention may be used with few modifications on widely-diffused standard motors, for example on motors denominated "asynchronous, rectangular K-series", of various thickness for different powers passing from a efficiency level of 20% to one of about 70%.

Furthermore, such motor is interchangeable with standard asynchronous motors without the need to implement particular modifications and in any case occupying in depth at least 70% less space for the same power on the axis. Such a situation offers the possibility of mass production of such motors with few variations on the production lines.

The invention claimed is:

1. Electric motor (1) comprising a single body stator (2), a single body magnetic induction core (3) constrained to said stator, at one coil of magnetic excitation (4a, 4b) associated to said induction core, a rotor (5) of substantially cylindrical shape comprising at least one permanent magnet adapted to form on said rotor at least two magnetic poles of opposite polarity, said induction core and said at least one coil being adapted to form at least two magnetic induction poles of opposite polarity on said induction core is produced in a single body and comprises a circular central bole (31) for housing said rotor (5), a ring-shaped air gap (8) between said rotor (5) and said induction core, at least two opposing extensions adapted to form said at least two magnetic induction poles in opposite position for each other and in proximity to said circular central hole, at least two opposing and external magnetic separation notches on the entirety of an outer surface of said induction core, said external magnetic separation notches being alternately arranged in respect to said extensions, adapted to generate a magnetic separation between two adjacent, opposite-sign poles of the induction core, such tat the rotor is arranged with each magnetic pole between two adjacent poles of the induction core when the motor is de-energized, said at least two opposing extensions are further characterized in that they are an integrally formed part of the single body magnetic core.

2. Motor according to claim 1, in which said induction core (3") comprises four equidistant extensions (32", 33", 34", 35").

3. Motor according to claim 2, in which said rotor (5") comprises four equidistant permanent magnets (52", 52", 53", 54").

4. Motor according to claim 1, in which said induction core (3') comprises two opposing extensions (32', 33').

5. Motor according to claim 4, in which said rotor (5') comprises two opposing permanent magnets (51', 52').

6. Motor according to claim 1, in which said rotor comprises a single permanent magnet with alternate poles arranged on the side surface of said rotor.

7. Motor according to claim 1, comparing a polarity sensor adapted control the position of the rotor.

8. Motor according to claim 1, comprising a polarity sensor adapted to control the position of the rotor.

9. Motor according to claim 1, characterized in that electrical energy is gained by the ends of the induction coils when mechanical energy is applied to the rotation axis.

10. Motor according to claims 1, 3, or 5 characterized in that permanent magnets are secured by insertion.

11. Motor according to claims 1 or 2 characterized in that a coil is associated with the inducrion pole.

12. Motor according to claim 7, characterized in that the polarity sensor is optical.

13. Motor according to claims 1 or 7, characterized in that polarity exchange is carried out with a brush manifold.

* * * * *